United States Patent
Wu et al.

(10) Patent No.: US 8,294,936 B2
(45) Date of Patent: Oct. 23, 2012

(54) METHOD AND SYSTEM OF DESIGNING HANDMADE PAPER CRAFTS

(75) Inventors: Yi-Fang Wu, Taipei Hsien (TW); Qin Wen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 608 days.

(21) Appl. No.: 12/556,584

(22) Filed: Sep. 10, 2009

(65) Prior Publication Data

US 2010/0231955 A1 Sep. 16, 2010

(51) Int. Cl.
*G06F 3/12* (2006.01)

(52) U.S. Cl. .......... 358/1.15; 53/410; 53/412; 446/487; 446/488; 700/95; 709/203

(58) Field of Classification Search .......... 358/1.15; 53/410, 412; 446/487, 488; 700/95; 709/203
See application file for complete search history.

(56) References Cited

U.S. PATENT DOCUMENTS

2003/0098994 A1* 5/2003 Tacke ........................ 358/1.18
2009/0277954 A1* 11/2009 De Paula et al. ............ 229/240
2009/0282782 A1* 11/2009 Walker et al. ............... 53/410
2010/0222908 A1* 9/2010 Gombert et al. ............ 700/98
2010/0231956 A1* 9/2010 Liu et al. ..................... 358/1.15

FOREIGN PATENT DOCUMENTS

WO WO 2005000681 A2 * 1/2005

OTHER PUBLICATIONS

Liang Lu et al., "Folding Cartons with Fixtures: A motion Planning Approach", IEEE Transactions on Robotics and Automation, vol. 16, No. 4, Aug. 2000.*

* cited by examiner

*Primary Examiner* — Jacky X Zheng
(74) *Attorney, Agent, or Firm* — Altis Law Group, Inc.

(57) ABSTRACT

A method of designing handmade paper crafts is disclosed. The method includes accessing a server from a client and selecting a three-dimensional view of a paper craft from a database in the server. The server computes a two-dimensional view of the paper craft according to the three-dimensional view of the paper craft. The two-dimensional view of the paper craft is capable of being made to form the three-dimensional view of the paper craft. In the two-dimensional view of the paper craft, a dotted line indicates a to be cut line and a solid line indicates a to be fold line. The client adds pictures or words on the two-dimensional view of the paper craft to create a modified two-dimensional view of the paper craft, and stores the modified two-dimensional view back in the server.

18 Claims, 4 Drawing Sheets

METHOD AND SYSTEM OF DESIGNING HANDMADE PAPER CRAFTS

BACKGROUND

1. Technical Field

The present disclosure relates to a method and a system of designing handmade paper crafts.

2. Description of Related Art

In origami, a folder of the paper may have to redo and repeat steps to get the final representation of the object. This is tedious and time consuming. Therefore a need exist to improve on the folding of paper to produce the final paper shape.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
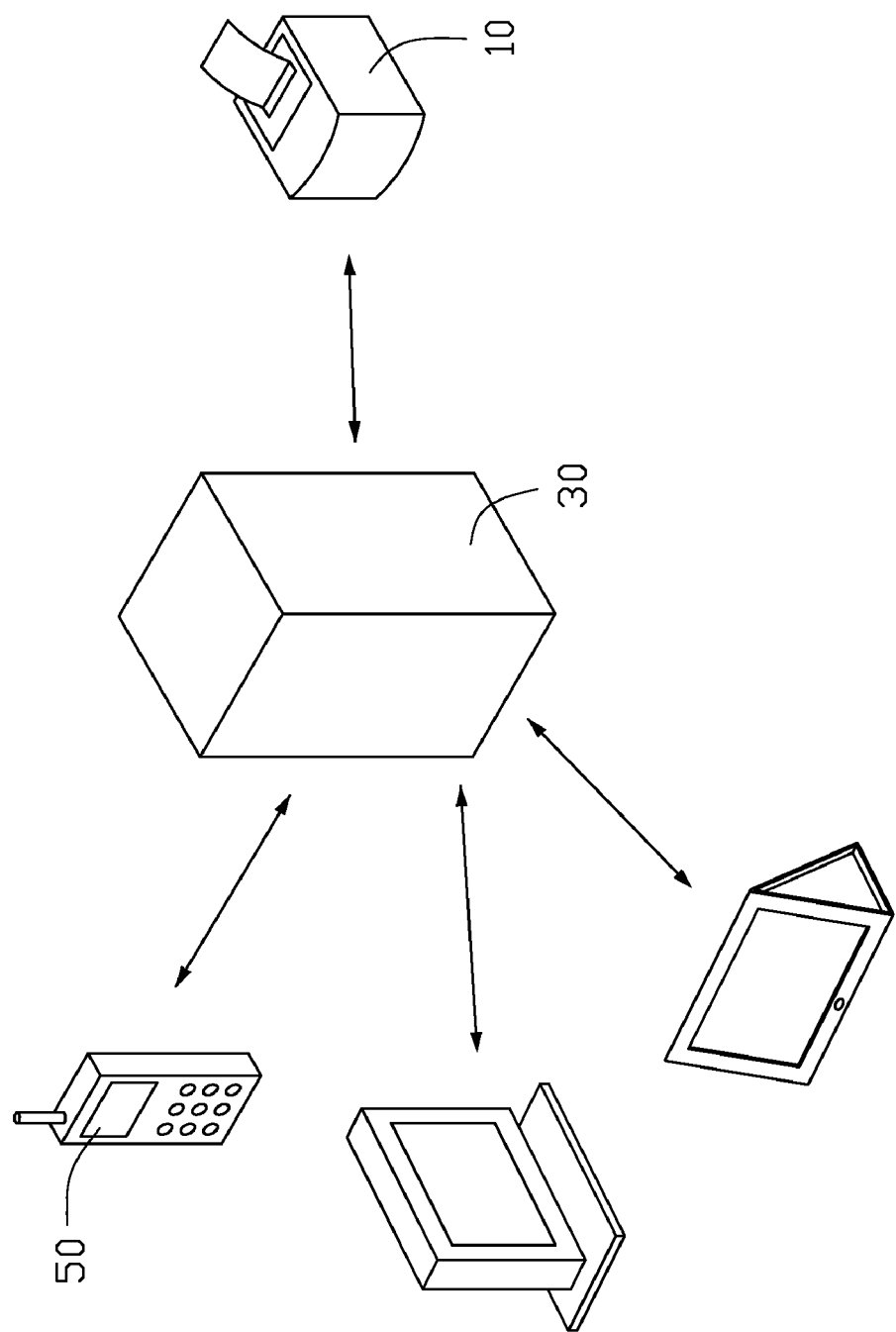
FIG. 1 is a construction view of a system of designing paper crafts.

Referring to FIG. 1, a system of designing handmade paper crafts is disclosed. The system includes a printer 10, a server 30 connected to the printer 10, a client 50 connected to the server 30. The client 50 may be a handset terminal, a computer, a digital photo frame and so on. The client 50 may connect with the server 30 through a wireless transfer protocol, for example, WIFI (Wireless Fidelity).

Figure 2:
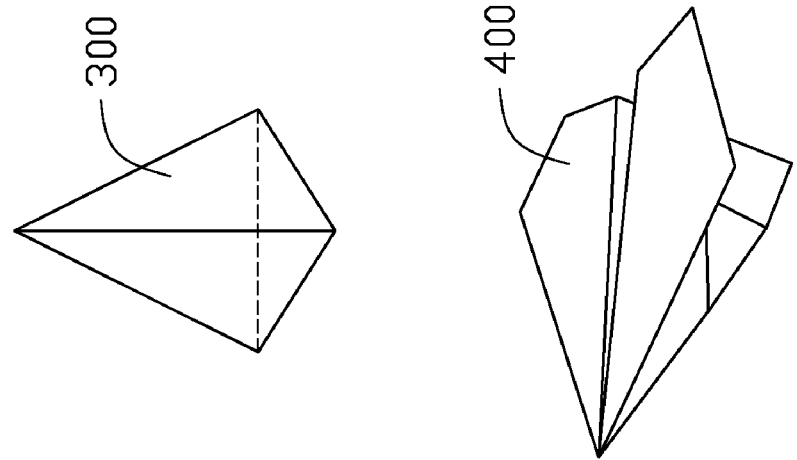
FIG. 2 is a template view of a system of designing paper crafts.
Figure 2:
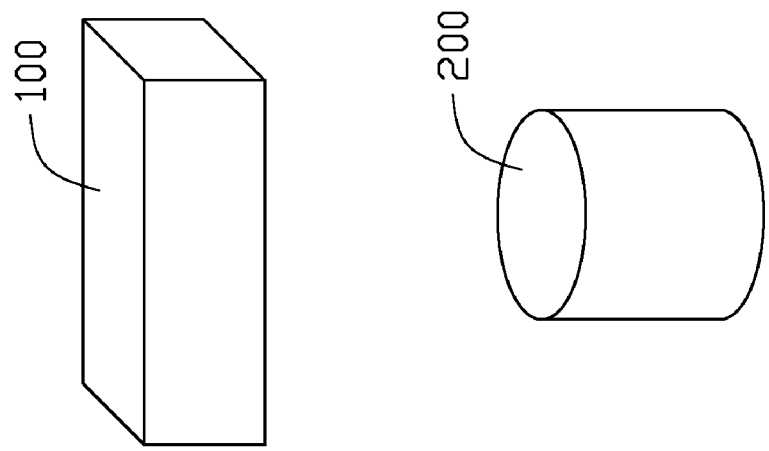

Referring to FIG. 2, the server 30 stores a plurality of three-dimensional view templates of paper crafts, such as, a box template 100, a cylinder template 200, a cone template 300, an airplane template 400 and so on.

Figure 3:
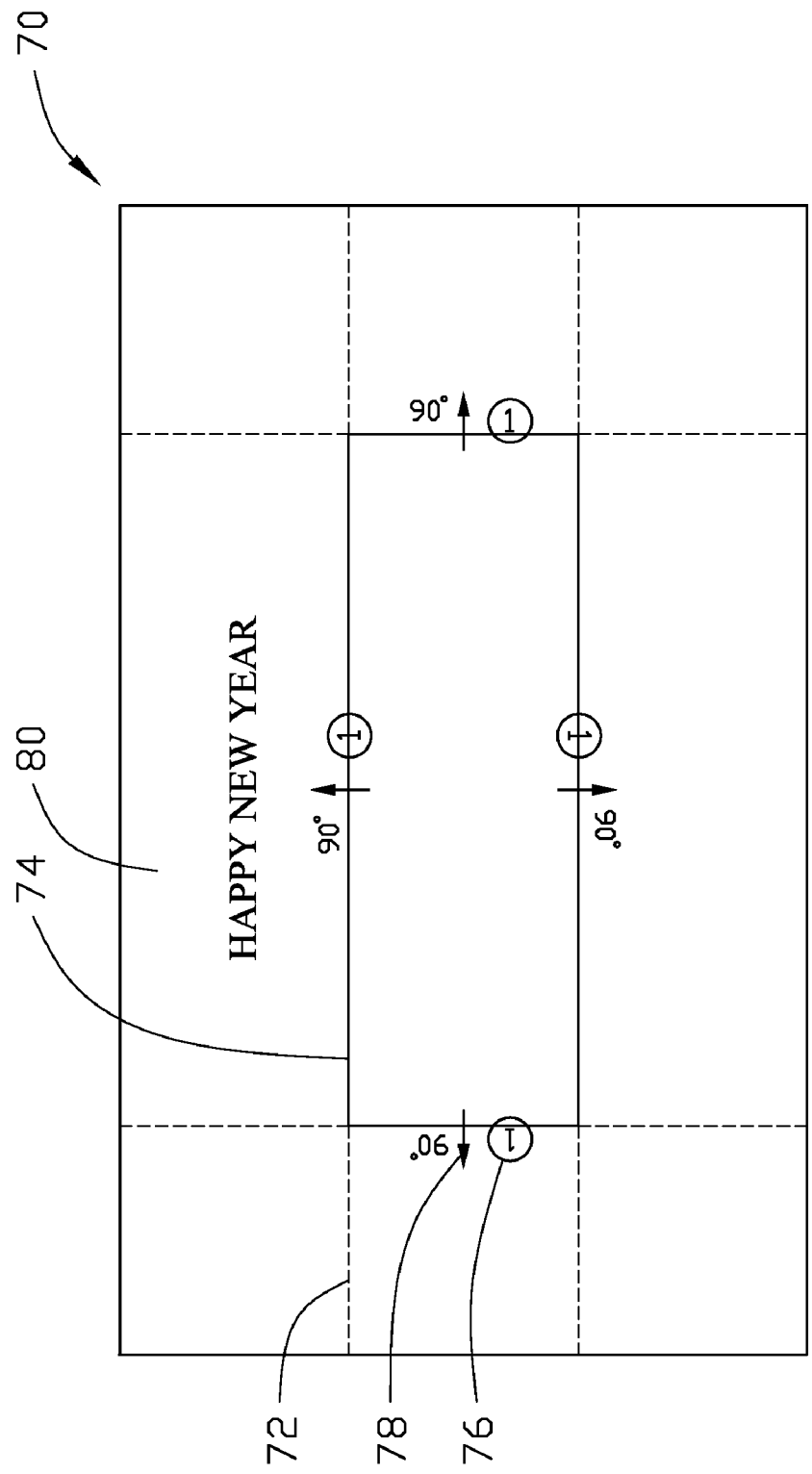
FIG. 3 is a two-dimensional folding view of a box craft.

Referring to FIG. 3, the three-dimensional view of the box template 100 is selected. The server 30 computes a two-dimensional folding view 70 of the paper craft according to the three-dimensional view of the paper craft. The client 50 displays a two dimensional folding view 70 of the box template 100. The two dimensional folding view 70 has a plurality of dotted lines along which a user should cut the paper and a plurality of solid lines indicating where the user should fold the paper. The solid lines are marked with sequence numbers to show a folding sequence and an arrow 78 to indicate a folding direction. A folding angle is shown adjacent to the arrow 78. A folding angle may range from negative 180 degrees to positive 180 degrees. A plurality of editing areas 80 is set on the box template 100 to allow addition of pictures and/or words to decorate the box template 100. The two-dimensional folding view 70 is viewed as a pre-print two-dimensional folding view after the two-dimensional folding view 70 is edited.

The client 50 displays the pre-print two-dimensional folding view and the corresponding three-dimensional view (how the selected template will look after it is printed out and cut and folded). The server 30 selects suitable print configuration according to the pre-print two-dimensional folding view. The print configuration may be, for example, a horizontal, a vertical, or a tilted paper configuration. Finally, the printer 10 prints the pre-print two-dimensional folding view. Users can fold the paper according to the two-dimensional folding view.

Figure 4:
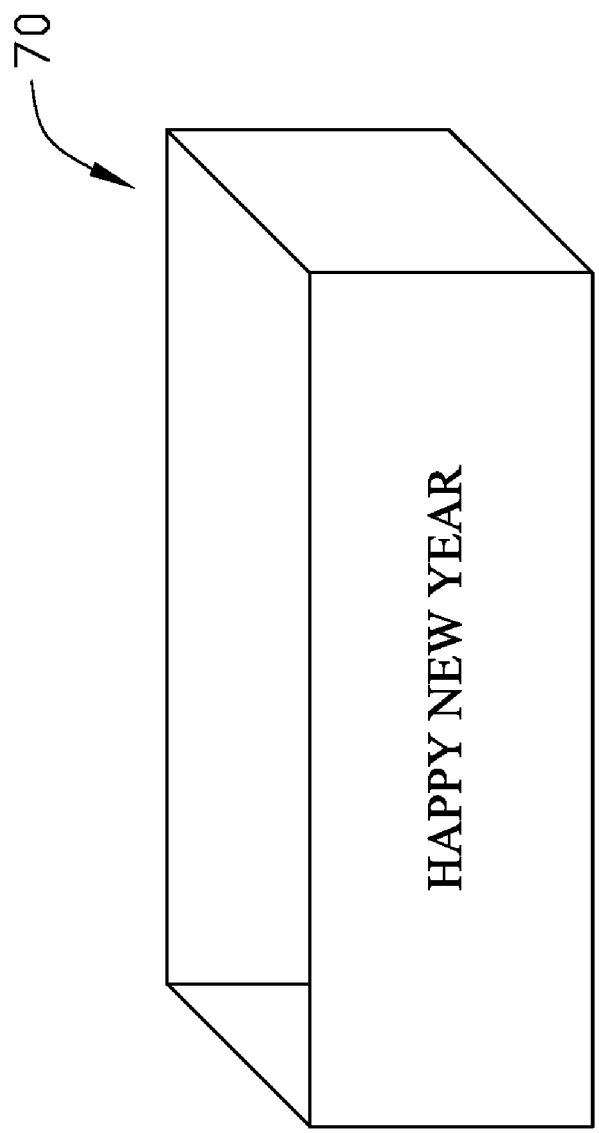
FIG. 4 is a three-dimensional view of the box craft of FIG. 3.

Referring also to FIG. 4, after the two-dimensional folding view is printed to paper, the paper can be folded to form the box.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of designing handmade paper crafts, comprising:

accessing a server from a client and selecting a three-dimensional view of a paper craft from a database in the server;

the server computing a two-dimensional view of the paper craft according to the three-dimensional view of the paper craft, wherein the two-dimensional view of the paper craft is capable of being made to form the three-dimensional view of the paper craft, in the two-dimensional view of the paper craft, a dotted line indicates a to be cut line and a solid line indicates a to be fold line;

the client adding pictures or words on the two-dimensional view of the paper craft to create a modified two-dimensional view of the paper craft, and storing the modified two-dimensional view back in the server;

the server outputting the modified two-dimensional view of the paper craft as a pre-printed two-dimensional view of the paper craft; and showing the modified two-dimensional view of the paper craft and the corresponding three-dimensional view of the paper craft in the client, the client selecting a suitable print configuration according to the two-dimensional folding view of the paper craft.

2. The method of claim 1, wherein the solid line is marked with sequence numbers to indicate a fold sequence.

3. The method of claim 1, wherein the solid line is marked with an arrow to show a fold direction.

4. The method of claim 1, wherein the solid line is marked with a fold angle.

5. The method of claim 4, wherein the fold angle ranges from negative 180 degrees to positive 180 degrees.

6. The method of claim 1, wherein the server connects to a printer and sends the pre-printed two-dimensional view of the paper craft to the printer to print.

7. The method of claim 1, wherein the client connects to the server through a wireless connection.

8. The method of claim 1, wherein the client is a handset terminal.

9. The method of claim 1, wherein the print configuration comprises horizontal, vertical, or tilted configuration to a print paper.

10. A system of designing handmade paper crafts, comprising:
a server capable of connecting with a client and a printer, the server having a database of three-dimensional views of paper crafts; wherein the client has access to the server and selects the three-dimensional view of the paper craft from the database, the server computes a two-dimensional folding view of the paper craft according to the three-dimensional view, a dotted line indicates the shearing and a solid line indicates the collapsing in the two-dimensional folding view, the client adds pictures or words to the two-dimensional folding view for showing the pictures or words on the three-dimensional view, and capable of selecting a suitable print configuration according with the two-dimensional folding view;
the printer receiving and printing the two-dimensional folding view from the server.

11. The system of claim 10, wherein the solid line is marked with sequence numbers to show fold sequence.

12. The system of claim 10, wherein the solid line is marked with arrows to show fold direction.

13. The system of claim 10, wherein the solid line is marked with a fold angle.

14. The system of claim 13, wherein the fold angle ranges from negative 180 degrees to positive 180 degrees.

15. The system of claim 10, wherein the client is capable of showing the two-dimensional folding view and the corresponding three-dimensional view before printing.

16. The system of claim 10, wherein the client is capable of connecting with the server through a wireless transfer protocol.

17. The system of claim 10, wherein the client is a handset terminal.

18. The system of claim 10, wherein the print configuration comprises horizontal, vertical, or tilted configuration to a print paper.

* * * * *

UNITED STATES PATENT AND TRADEMARK OFFICE
CERTIFICATE OF CORRECTION

PATENT NO. : 8,294,936 B2
APPLICATION NO. : 12/556584
DATED : October 23, 2012
INVENTOR(S) : Yi-Fang Wu and Qin Wen Page 1 of 1

It is certified that error appears in the above-identified patent and that said Letters Patent is hereby corrected as shown below:

Title Page, below Item (65) insert

-- (30)     Foreign Application Priority Data

Mar. 13, 2009   (CN) ........................200910300818.4 --

Signed and Sealed this
Twenty-ninth Day of October, 2013

Teresa Stanek Rea
*Deputy Director of the United States Patent and Trademark Office*